United States Patent [19]

Kawabata et al.

[11] Patent Number: 4,552,853

[45] Date of Patent: Nov. 12, 1985

[54] DIELECTRIC CERAMIC COMPOSITION

[75] Inventors: Kenji Kawabata; Yukio Sakabe, both of Nagaokakyo, Japan

[73] Assignee: Murata Manufacturing Co., Ltd., Japan

[21] Appl. No.: 629,715

[22] Filed: Jul. 11, 1984

[30] Foreign Application Priority Data

Jul. 18, 1983 [JP] Japan ................................ 58-131748

[51] Int. Cl.$^4$ ........................................... C04B 35/36
[52] U.S. Cl. .................................. 501/134; 501/132; 501/136
[58] Field of Search .............................. 501/136, 132

[56] References Cited

U.S. PATENT DOCUMENTS

| | | | |
|---|---|---|---|
| 3,869,398 | 3/1975 | Yamaoka et al. | 501/136 |
| 3,933,668 | 1/1976 | Takahashi et al. | 501/136 |
| 4,367,265 | 1/1983 | Yu et al. | 501/136 |
| 4,405,478 | 9/1983 | Murase et al. | 501/136 |
| 4,485,181 | 11/1984 | Sakabe | 501/136 |

FOREIGN PATENT DOCUMENTS

| | | | |
|---|---|---|---|
| 52-61978 | 5/1977 | Japan | 501/136 |
| 53-25899 | 3/1978 | Japan | 501/136 |

*Primary Examiner*—William R. Dixon, Jr.
*Assistant Examiner*—Karl Group
*Attorney, Agent, or Firm*—Ostrolenk, Faber, Gerb & Soffen

[57] ABSTRACT

A dielectric ceramic composition comprises a main component comprising, in percent by weight, 32 to 47% $SrTiO_3$, 26.5 to 46% $PbTiO_3$, 8 to 16% $CaTiO_3$, 5 to 16% $Bi_2O_3$, and 3 to 10% $TiO_2$; ZnO in an amount of 1 to 3.8% of the total composition; and $SiO_2$ in an amount of 1 to 3.8% of the total composition. The dielectric ceramic composition having a high dielectric constant, a small voltage dependence of dielectric properties, and a low firing temperature.

6 Claims, No Drawings

DIELECTRIC CERAMIC COMPOSITION

This invention relates to dielectric ceramic compositions and, more particularly, to dielectric ceramic compositions for ceramic capacitors.

In general, a dielectric ceramic composition of a barium titanate system has been extensively used as a dielectric material for ceramic capacitors because of its high dielectric constant. However, ceramic capacitors made of the barium titanate dielectric ceramics have the disadvantage that their capacity and dielectric loss varies greatly with an alternating current (AC) voltage applied thereto. For example, the dielectric dissipation factor (tan δ) varies from 5 to 15% with a change of the applied AC voltage within a range of from 200 to 400 V/mm. Such problems may be solved by the use of dielectric ceramic compositions of a strontium titanate system which have low dependency of dielectric properties on voltage as compared with the barium titanate system. Although the dielectric ceramic compositions of this system have become put into practical use, there is another problem awaiting a solution. The strontium titanate dielectric ceramic composition must be fired at a high temperatures ranging from about 1240° to 1320° C. to obtain the desired dielectric properties. Thus, the use of the strontium titanate dielectric ceramics as the dielectric material for monolithic capacitors necessitates the use of a highly expensive electrode material because, electrode materials of the monolithic capacitors are required to meet the following requirements: (1) must have a high melting point and high resistance to oxidation, and (2) must not react with the dielectric ceramic compositions at the firing conditions. Such requirements are fully met only by noble metals such as platinum that have a high chemical resistance and high melting point. Accordingly, the use of strontium titanate system ceramics results in a considerable increase of manufacturing cost of the monolithic ceramic capacitors.

It is therefore an object of the present invention to provide a dielectric ceramic composition which overcomes aforesaid disadvantages.

Another object of the present invention is to provide a dielectric ceramic composition having high dielectric constant, small voltage dependence of dielectric properties, and a low firing temperature.

These and other objects may be achieved by providing a dielectric ceramic composition comprising a main component comprising, in percent by weight, 32 to 47% $SrTiO_3$, 26.5 to 46% $PbTiO_3$, 8 to 16% $CaTiO_3$, 5 to 16% $Bi_2O_3$, and 3 to 10% $TiO_2$; ZnO in an amount of 1 to 4 parts by weight per 100 parts by weight of the main component (1 to 3.8% of total composition); and $SiO_2$ in an amount of 1 to 4 parts by weight per 100 parts by weight of the main component (1 to 3.8% of total composition).

The dielectric ceramic composition of the present invention may be produced in the known manner, for example, by techniques conventionally employed for the production of dielectric ceramics.

According to the present invention, it is possible to produce dielectric ceramic compositions having high dielectric constant ranging from 1000 to 3900, less than 1% of dielectric dissipation factor, and small increase in dissipation factor under high voltage AC field. Also, the compositions of the present invention may be produced by firing at a relatively low temperature ranging from about 1040° to 1100° C., thus making it possible to use a less expensive electrode material such as silver-palladium alloys, for the manufacture of monolithic capacitors.

The reasons why the composition of the main component has been limited to the above range are as follows: If a content of $SrTiO_3$ in the main component is less than 32 wt%, it causes the dielectric dissipation factor to increase to more than 1%, and the dielectric dissipation factor under the high voltage AC field become large. If the content of $SrTiO_3$ exceeds 47 wt%, it causes the dielectric constant to lower to less than 1000. For these reasons, the content of $SrTiO_3$ in the main component has been limited within the range of 32 to 47 wt%. If a content of $PbTiO_3$ in the main component is less than 28 wt%, it causes the dielectric constant to lower to less than 1000. If the content of $PbTiO_3$ exceeds 46 wt%, it causes the dielectric dissipation factor to increase to more than 1%, and the dielectric dissipation factor under the high voltage AC field to become larger. Accordingly, the content of $SrTiO_3$ in the main component has been limited within the range of 32 to 47 wt%. If a content of $CaTiO_3$ in the main component is less than 8 wt%, the dielectric dissipation factor exceeds 1%, and if the content of $CaTiO_3$ exceeds 16 wt%, the dielectric constant is less than 1000. For the above reasons, the content of $CaTiO_3$ in the main component has been limited within the range of 8 to 16 wt%. The reasons why the content of $Bi_2O_3$ has been limited within the range of 5 to 16 wt% are that if the content of $Bi_2O_3$ in the main component is less than 5 wt%, dielectric constant is less than 1000, and a $Bi_2O_3$ content exceeding 16 wt% provides the dielectric dissipation factor to exceed 1% and results in the increasing of dielectric dissipation factor under high voltage AC field. The content of $TiO_2$ in the main component has been limited within the range of 3 to 10 wt% for the following reasons. If the content of $TiO_2$ is less than 3 wt%, the dielectric constant is less than 1000. If the content of $TiO_2$ exceeds 10 wt%, the dielectric dissipation factor exceeds 1%.

The additives, ZnO and $SiO_2$, are added to lower the firing temperature of the composition and to improve dielectric properties. Each of ZnO and $SiO_2$ is included in the dielectric ceramic composition in an amount of 1 to 4 parts by weight per 100 parts by weight of the main component (i.e. 1 to 3.8% of the total composition). The reasons why the contents of both ZnO and $SiO_2$ have been limited to the above ranges are as follows: If the content of each additive is less than 1 part by weight per 100 parts by weight of the main component (i.e. 1 w%), the firing temperature exceeds 1100° C., and if the content of each additive exceeds 4 parts by weight (i.e. 3.8 w% of total), the dielectric constant is less than 1000. For these reasons, the contents of ZnO and $SiO_2$ have been respectively limited within the range of 1 to 4 parts by weight per 100 parts by weight of the main component.

The present invention will be further apparent from the following description with reference to examples thereof.

EXAMPLES

Using PbO, $SrCO_3$, $CaCO_3$, $TiO_2$, $Bi_2O_3$, ZnO and $SiO_2$ as raw materials, there were prepared mixtures each having a composition shown in Table 1. Each mixture was milled by the wet process for 16 hours in a polyethylene jar mill with porcelain balls of high purity aluminum oxide, dehydrated, dried and the calcined at 950° C. in a zirconia saggar. The resultant powder was crushed, granulated and then pressed to form discs of 12 mm in diameter, 0.6 mm thick, under a pressure of 1000 kg/cm². The resultant disks were fired in air at a temperature ranging from 1040° to 1270° C. for two hours to prepare disk samples of the compositions.

TABLE 1

| | Composition | | | | | | |
|---|---|---|---|---|---|---|---|
| | Main component (parts by weight) | | | | | Additive (parts by weight) | |
| No. | SrTiO₃ | PbTiO₃ | CaTiO₃ | Bi₂O₃ | TiO₂ | ZnO | SiO₂ |
| 1 | 38.8 | 30.7 | 14.9 | 10.4 | 5.2 | 1.9 | 1.9 |
| 2 | 36.8 | 32.9 | 14.8 | 10.3 | 5.2 | 1.9 | 1.9 |
| 3 | 39.0 | 34.7 | 11.1 | 10.0 | 5.2 | 1.9 | 1.9 |
| 4 | 40.9 | 32.6 | 11.2 | 10.1 | 5.2 | 1.9 | 1.9 |
| 5 | 42.4 | 34.4 | 8.3 | 9.9 | 5.0 | 1.9 | 1.9 |
| 6 | 46.2 | 30.1 | 8.4 | 10.1 | 5.2 | 1.9 | 1.9 |
| 7 | 32.9 | 42.7 | 14.5 | 6.1 | 3.8 | 1.9 | 1.9 |
| 8 | 41.8 | 32.5 | 15.2 | 6.4 | 4.1 | 1.9 | 1.9 |
| 9 | 36.1 | 46.0 | 8.3 | 5.9 | 3.7 | 1.9 | 1.9 |
| 10 | 44.8 | 36.4 | 8.8 | 6.2 | 3.8 | 1.9 | 1.9 |
| 11 | 36.2 | 28.1 | 13.1 | 15.7 | 6.9 | 1.9 | 1.9 |
| 12 | 38.7 | 31.4 | 8.2 | 15.0 | 6.7 | 1.9 | 1.9 |
| 13 | 44.8 | 36.4 | 8.8 | 6.2 | 3.8 | 3.8 | 1.9 |
| 14 | 39.0 | 26.5 | 15.0 | 10.0 | 9.5 | 1.9 | 1.9 |
| 15 | 44.8 | 36.4 | 8.8 | 6.2 | 3.8 | 1 | 3.8 |
| 16 | 38.8 | 30.7 | 14.9 | 10.4 | 5.2 | 1 | 2.9 |
| 17 | 38.8 | 30.7 | 14.9 | 10.4 | 5.2 | 2.9 | 1 |
| 18* | 29.2 | 47.5 | 8.3 | 10.0 | 5.0 | 1.9 | 1.9 |
| 19* | 31.1 | 40.3 | 13.7 | 9.9 | 5.0 | 1.9 | 1.9 |
| 20* | 28.6 | 37.1 | 12.6 | 15.0 | 6.7 | 1.9 | 1.9 |
| 21* | 37.9 | 41.3 | 6.4 | 9.6 | 4.8 | 1.9 | 1.9 |
| 22* | 48.5 | 27.0 | 9.5 | 10.0 | 5.0 | 1.9 | 1.9 |
| 23* | 45.3 | 31.2 | 8.4 | 10.1 | 5.0 | 0 | 0 |
| 24* | 45.3 | 31.2 | 8.4 | 10.1 | 5.0 | 0 | 3.8 |
| 25* | 45.3 | 31.2 | 8.4 | 10.1 | 5.0 | 3.8 | 0 |
| 26* | 44.8 | 36.4 | 8.8 | 6.2 | 3.8 | 3.8 | 4.6 |
| 27* | 44.8 | 36.4 | 8.8 | 6.2 | 3.8 | 4.6 | 3.8 |

Silver paste was printed on the opposed surfaces of the ceramic disks, and then baked the same at 800° C. to prepare specimens for the measurements of dielectric properties.

Each specimen was subjected to measurements of dielectric dissipation factor (tan δ) and dielectric constant (ε) at 1 KHz, 1 Vrms. The dielectric constant was measured at room temperature, −25° C. and +85° C., respectively. Also, the dielectric dissipation factor (tan δ) under a high AC voltage was measured by applying an AC voltage of 400 V/mm with 60 Hz. Results are shown in Table 2 together with the firing temperature and change rate of dielectric constant on temperature.

The change rate of dielectric constant (ε) on temperature was obtained from the following equations:

$$\text{Change rate of dielectric constant } (\epsilon)\ (\%) =$$

$$\frac{\epsilon' - \epsilon_o}{\epsilon_o} \times 100$$

$$\text{or} = \frac{\epsilon'' - \epsilon_o}{\epsilon_o} \times 100$$

where
$\epsilon_o$ = dielectric constant at +25° C.
$\epsilon'$ = dielectric constant at −25° C.
$\epsilon''$ = dielectric constant at +85° C.

In Tables 1 and 2, asterisks (*) show the specimens having a dielectric ceramic composition out of the scope of the present invention.

TABLE 2

| No | Firing temp. (°C.) | ε | tan δ (%) | Change rate of dielectric const. | | tan δ under AC field 400 V/mm at 60 Hz (%) |
|---|---|---|---|---|---|---|
| | | | | −25° C. | +85° C. | |
| 1 | 1080 | 1320 | 0.40 | +14.9 | −23.1 | 0.9 |
| 2 | 1080 | 1494 | 0.45 | +13.0 | −23.9 | 1.0 |
| 3 | 1060 | 2580 | 0.40 | +9.2 | −28.4 | 1.1 |
| 4 | 1060 | 2310 | 0.40 | +18.6 | −29.1 | 0.8 |
| 5 | 1060 | 3510 | 0.60 | −36.2 | −35.6 | 1.7 |
| 6 | 1060 | 1150 | 0.33 | +14.0 | −34.0 | 0.8 |
| 7 | 1060 | 2690 | 0.98 | −22.7 | −37.3 | 3.0 |
| 8 | 1060 | 1450 | 0.30 | +24.8 | −28.2 | 0.8 |
| 9 | 1060 | 3840 | 0.91 | −48.3 | −40.1 | 3.1 |
| 10 | 1060 | 3400 | 0.42 | −3.6 | −43.5 | 1.0 |
| 11 | 1060 | 1680 | 0.63 | −5.7 | −21.2 | 1.0 |
| 12 | 1060 | 3210 | 0.53 | −6.3 | −28.8 | 2.0 |
| 13 | 1040 | 1000 | 0.50 | −4.0 | −39.9 | 1.3 |
| 14 | 1060 | 1400 | 0.50 | +10.0 | −26.5 | 1.5 |
| 15 | 1040 | 1000 | 0.48 | −3.9 | −43.0 | 1.2 |
| 16 | 1060 | 1380 | 0.35 | +13.9 | −24.5 | 0.9 |
| 17 | 1100 | 1000 | 0.50 | +15.0 | −23.0 | 1.0 |
| 18* | 1060 | 1100 | 3.80 | −35.0 | −6.7 | 11.0 |
| 19* | 1060 | 3520 | 2.10 | −28.9 | −27.6 | 5.3 |
| 20* | 1060 | 2700 | 2.10 | −20.8 | −17.7 | 4.9 |
| 21* | 1060 | 3000 | 3.10 | −65.4 | −18.2 | 10.0 |
| 22* | 1060 | 790 | 0.30 | +10.0 | −34.2 | 0.8 |
| 23* | 1270 | 5400 | 0.10 | +42.8 | −44.5 | 0.5 |
| 24* | 1150 | 2300 | 0.20 | +42.0 | −44.1 | 0.6 |
| 25* | 1180 | 2000 | 0.25 | +43.0 | −40.0 | 0.6 |
| 26* | 1040 | 600 | 0.60 | −4.0 | −39.4 | 1.0 |
| 27* | 1040 | 450 | 0.60 | −4.0 | −39.0 | 1.0 |

As can be seen from the results in Table 2, the specimens Nos. 1 to 17 comprising dielectric ceramic compositions of the present invention have a high dielectric constant of not less than 1000, and small dielectric dissipation factor of less than 1%. In addition, the dielectric ceramic compositions of the present invention have a low firing temperature which is 140° to 200° C. lower than that of the conventionally used dielectric ceramic compositions of the strontium titanate system. Further, the dielectric ceramic compositions according to the present invention exhibit a small dielectric dissipation factor (tan δ) ranging from 0.8 to 4.0% even if they are applied an AC voltage of 400 V/mm. Accordingly, the compositions of the present invention have low dependency on AC voltage as compared with the conventional dielectric ceramic compositions. From the results for specimens Nos. 18 to 21, it will be seen that the SrTiO₃ content less than 32%, or PbTiO₃ content exceeding 46%, or the CaTiO₃ content less than 8% causes the composition to increase the dielectric dissipation factor. From the results for the specimen No. 22, it will be seen that the SrTiO₃ content exceeding 47% and the PbTiO₃ content less than 28% causes the deterioration of dielectric constant. It will be further understood from the results for the specimens Nos. 23 to 27 that the contents of additives, ZnO and SiO₂, beyond the range mentioned above causes a rise of the firing temperature or a decrease of the dielectric constant.

Accordingly, it is possible with the present invention to produce dielectric ceramic compositions having excellent dielectric properties at a firing temperature of less than 1100° C. The present invention makes it possible to produce monolithic ceramic capacitors by using less expensive silver-palladium alloys as a material for internal electrodes. Thus, it is possible to reduce a manufacturing cost of the monolithic ceramic capacitors.

What we claim is:

1. A dielectric ceramic composition comprising, in percent by weight, 32 to 47% SrTiO₃, 26.5 to 46%

PbTiO$_3$, 8 to 16% CaTiO$_3$, 5 to 16% Bi$_2$O$_3$, 3 to 10% TiO$_2$, 1 to 3.8% ZnO and 1 to 3.8% SiO$_2$.

2. A dielectric ceramic composition according to claim 1 in which the percent by weight of SrTiO$_3$ is 32.9 to 46.2%, of PbTiO$_3$ is 28.1 to 46%, of CaTiO$_3$ is 8.3 to 15.2%, of Bi$_2$O$_3$ is 5.9 to 15.7% and of TiO$_2$ is 3.7 to 5.5%.

3. A dielectric ceramic composition according to claim 2 in which the amount of each of the ZnO and SiO$_2$ in percent by weight is 1.9%.

4. A dielectric ceramic composition according to claim 1 comprising, in percent by weight, 36.8 to 46.2% SrTiO$_3$, 30.1 to 34.7% PbTiO$_3$, 8.4 to 14.9% CaTiO$_3$, 10 to 10.4% Bi$_2$O$_3$, 5 to 5.2% TiO$_2$, 1 to 2.9% ZnO and 1 to 2.9% SiO$_2$.

5. A dielectric ceramic composition according to claim 1 comprising, in percent by weight, 32.9 to 44.8% SrTiO$_3$, 32.5 to 46% PbTiO$_3$, 8.3 to 15.2% CaTiO$_3$, 5.9 to 6.4% Bi$_2$O$_3$, 3.8 to 4.1% TiO$_2$, 1 to 3.8% ZnO and 1.9 to 3.8% SiO$_2$.

6. A dielectric ceramic composition according to claim 1 comprising, in percent by weight, 36.2 to 39% SrTiO$_3$, 26.5 to 31.4% PbTiO$_3$, 8.2 to 15% CaTiO$_3$, 10 to 15.7% Bi$_2$O$_3$, 6.7 to 9.5% TiO$_2$, 1.9% ZnO and 1.9% SiO$_2$.

* * * * *